(12) United States Patent
Xie et al.

(10) Patent No.: US 11,397,559 B2
(45) Date of Patent: Jul. 26, 2022

(54) METHOD AND SYSTEM BASED ON SPEECH AND AUGMENTED REALITY ENVIRONMENT INTERACTION

(71) Applicant: BAIDU ONLINE NETWORK TECHNOLOGY (BEIJING) CO., LTD., Beijing (CN)

(72) Inventors: Gaoxi Xie, Beijing (CN); Yuqiao Teng, Beijing (CN); Dayun Ren, Beijing (CN); Miao Yao, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 209 days.

(21) Appl. No.: 16/177,060

(22) Filed: Oct. 31, 2018

(65) Prior Publication Data

US 2019/0235833 A1    Aug. 1, 2019

(30) Foreign Application Priority Data

Jan. 30, 2018    (CN) .......................... 201810090559.6

(51) Int. Cl.
| | | |
|---|---|---|
| *G06F 3/16* | (2006.01) | |
| *G06T 19/00* | (2011.01) | |
| *G10L 15/26* | (2006.01) | |

(52) U.S. Cl.
CPC ............ *G06F 3/167* (2013.01); *G06T 19/003* (2013.01); *G06T 19/006* (2013.01); *G10L 15/26* (2013.01)

(58) Field of Classification Search
CPC ....... G06T 19/006; G06T 19/20; G06F 3/011; G06F 3/167; G06F 3/04815; G06K 9/00671; G10L 15/22; G10L 15/26; G10L 2015/223; G10L 15/1815

See application file for complete search history.

(56) References Cited

U.S. PATENT DOCUMENTS

| | | | | |
|---|---|---|---|---|
| 2014/0310595 | A1* | 10/2014 | Acharya | G06F 3/04842 715/706 |
| 2016/0124501 | A1 | 5/2016 | Lam et al. | |
| 2016/0364788 | A1* | 12/2016 | Jo | G06K 9/325 |
| 2017/0004651 | A1* | 1/2017 | Xiong | G06F 1/1605 |
| 2017/0169611 | A1* | 6/2017 | Ramirez Flores | A63F 13/26 |
| 2017/0206691 | A1* | 7/2017 | Harrises | G02B 27/0172 |
| 2017/0337747 | A1* | 11/2017 | Hull | G06T 19/006 |
| 2017/0366554 | A1* | 12/2017 | Hook | H04L 63/101 |

(Continued)

FOREIGN PATENT DOCUMENTS

| | | |
|---|---|---|
| CN | 1410298 A | 4/2003 |
| CN | 102520788 A | 6/2012 |

(Continued)

*Primary Examiner* — Mark Villena
(74) *Attorney, Agent, or Firm* — Seed IP Law Group LLP

(57) ABSTRACT

The present disclosure provides a method and system based on speech and augmented reality environment interaction. The method comprises: obtaining a user's speech data and obtaining an operation instruction corresponding to the speech data; performing processing for the augmented reality environment according to the operation instruction, and displaying an augmented reality processing result. According to the present embodiment, it is possible to improve an interaction efficiency of the augmented reality environment by means of the speech and augmented reality environment interaction.

12 Claims, 2 Drawing Sheets

```
┌─────────────────────────────────────────────┐
│ Obtain a user's speech data and obtain an   │
│   operation instruction corresponding to    │───S11
│              the speech data                │
└─────────────────────────────────────────────┘
                      │
                      ▼
┌─────────────────────────────────────────────┐
│  Perform processing for the augmented       │
│  reality environment according to the       │───S12
│  operation instruction, and display an      │
│  augmented reality processing result        │
└─────────────────────────────────────────────┘
```

(56) References Cited

U.S. PATENT DOCUMENTS

| | | | |
|---|---|---|---|
| 2018/0004481 A1* | 1/2018 | Fallon | G06F 3/04815 |
| 2018/0089895 A1* | 3/2018 | Anderson | A63F 13/25 |
| 2018/0096681 A1* | 4/2018 | Ni | G10L 15/1815 |
| 2018/0108357 A1* | 4/2018 | Liu | G06F 3/167 |
| 2018/0165978 A1* | 6/2018 | Wood | G09B 5/02 |
| 2018/0276841 A1* | 9/2018 | Krishnaswamy | G06K 9/00671 |
| 2019/0026936 A1* | 1/2019 | Gorur Sheshagiri | G06F 3/04842 |
| 2019/0043260 A1* | 2/2019 | Anderson | G06T 19/006 |
| 2019/0172261 A1* | 6/2019 | Alt | G02B 27/017 |
| 2019/0258318 A1* | 8/2019 | Qin | G06F 3/04842 |

FOREIGN PATENT DOCUMENTS

| | | | |
|---|---|---|---|
| CN | 103257703 A | 8/2013 | |
| CN | 103632664 A | 3/2014 | |
| CN | 103793063 A | 5/2014 | |
| CN | 105117195 A | 12/2015 | |
| CN | 105468142 A | 4/2016 | |
| CN | 106200930 A | 12/2016 | |
| CN | 106558310 A | 4/2017 | |

\* cited by examiner

METHOD AND SYSTEM BASED ON SPEECH AND AUGMENTED REALITY ENVIRONMENT INTERACTION

The present application claims the priority of Chinese Patent Application No. 201810090559.6, filed on Jan. 30, 2018, with the title of "Method and system based on speech and augmented reality environment interaction". The disclosure of the above applications is incorporated herein by reference in its entirety.

FIELD OF THE DISCLOSURE

The present disclosure relates to the field of automatic control, and particularly to a method and system based on speech and augmented reality environment interaction.

BACKGROUND OF THE DISCLOSURE

Augmented Reality (AR) is a technology for calculating, in real time, a position and angle of a camera image and adding a corresponding image, video and 3D model. A target of augmented reality is to overlay a virtual world on a real world on a screen for interaction.

As mobile phone mobile devices and handheld mobile devices prevail, mobile device-based augmented reality (AR environment) is increasingly recognized by users.

However, the mobile device-based augmented reality environment exhibits a single interaction means, and only supports gesture interaction or GPS+posture sensor capability possessed by the mobile device itself. Using the gesture interaction or mobile device posture interaction increases unnecessary acts and affects the interaction efficiency.

SUMMARY OF THE DISCLOSURE

A plurality of aspects of the present disclosure provide a method and system based on speech and augmented reality environment interaction, to improve an interaction efficiency of augmented reality environment.

According to an aspect of the present disclosure, there is provided a method based on speech and augmented reality environment interaction, comprising:

obtaining a user's speech data and obtaining an operation instruction corresponding to the speech data;

performing processing for the augmented reality environment according to the operation instruction, and displaying an augmented reality processing result.

The abovementioned aspect and any possible implementation mode further provide an implementation mode: the obtaining a user's speech data and obtaining an operation instruction corresponding to the speech data comprises:

activating speech monitoring service to monitor the user's speech data;

performing speech recognition for the speech data to obtain a recognized text corresponding to the speech data;

performing semantic analysis for the recognized text to obtain an operation instruction corresponding to the recognized text.

The abovementioned aspect and any possible implementation mode further provide an implementation mode: the performing semantic analysis for the recognized text to obtain an operation instruction corresponding to the recognized text comprises:

performing precise matching for the recognized text in the preset operation instruction and looking up the corresponding operation instruction; and/or, performing word segmentation processing for the recognized text to generate a keyword, and looking up an operation instruction matched with the keyword.

The abovementioned aspect and any possible implementation mode further provide an implementation mode: when the keyword is successfully matched with at least two operation instructions, obtaining the corresponding operation instruction according to the user's further selection.

The abovementioned aspect and any possible implementation mode further provide an implementation mode: the augmented reality environment comprises: a preset augmented reality sub-environment scenario; or an augmented reality sub-environment scenario obtained by performing feature analysis for a reality scenario captured by the camera.

The abovementioned aspect and any possible implementation mode further provide an implementation mode: the performing processing for the augmented reality environment according to the operation instruction comprises:

performing a corresponding augmented reality control operation for augmented reality information in the augmented reality sub-environment scenario according to the operation instruction.

According to another aspect of the present disclosure, there is provided a system based on speech and augmented reality environment interaction, comprising:

an operation instruction obtaining module configured to obtain a user's speech data and obtain an operation instruction corresponding to the speech data;

an augmented reality processing module configured to perform augmented reality processing for the augmented reality environment according to the operation instruction, and display an augmented reality processing result.

The abovementioned aspect and any possible implementation mode further provide an implementation mode: the operation instruction obtaining module specifically comprises:

a speech obtaining submodule configured to activate the user's speech data;

a speech recognition submodule configured to perform speech recognition for the speech data to obtain a recognized text corresponding to the speech data;

a sematic analysis submodule configured to perform semantic analysis for the recognized text to obtain an operation instruction corresponding to the recognized text.

The abovementioned aspect and any possible implementation mode further provide an implementation mode: the semantic analysis submodule is specifically configured to:

perform precise matching for the recognized text in the preset operation instruction and look up the corresponding operation instruction; and/or, perform word segmentation processing for the recognized text to generate a keyword, and look up an operation instruction matched with the keyword.

The abovementioned aspect and any possible implementation mode further provide an implementation mode: the semantic analysis submodule is specifically configured to:

when the keyword is successfully matched with at least two operation instructions, obtain the corresponding operation instruction according to the user's further selection.

The abovementioned aspect and any possible implementation mode further provide an implementation mode: the augmented reality environment comprises: a preset augmented reality sub-environment scenario; or an augmented reality sub-environment scenario obtained by performing feature analysis for a reality scenario captured by the camera.

The abovementioned aspect and any possible implementation mode further provide an implementation mode: the augmented reality processing module is specifically configured to:

perform a corresponding augmented reality control operation for augmented reality information in the augmented reality sub-environment scenario according to the operation instruction.

A further aspect of the present disclosure provides a computer device, comprising a memory, a processor and a computer program which is stored on the memory and runnable on the processor, wherein the processor, upon executing the program, implements the above-mentioned method.

A further aspect of the present disclosure provides a computer-readable storage medium on which a computer program is stored, wherein the program, when executed by a processor, implements the aforesaid method.

As known from the technical solutions, embodiments of the present disclosure may improve an interaction efficiency of the augmented reality environment.

BRIEF DESCRIPTION OF DRAWINGS

To describe technical solutions of embodiments of the present disclosure more clearly, figures to be used in the embodiments or in depictions regarding the prior art will be described briefly. Obviously, the figures described below are only some embodiments of the present disclosure. Those having ordinary skill in the art appreciate that other figures may be obtained from these figures without making inventive efforts.

DETAILED DESCRIPTION OF PREFERRED EMBODIMENTS

To make objectives, technical solutions and advantages of embodiments of the present disclosure clearer, technical solutions of embodiment of the present disclosure will be described clearly and completely with reference to figures in embodiments of the present disclosure. Obviously, embodiments described here are partial embodiments of the present disclosure, not all embodiments. All other embodiments obtained by those having ordinary skill in the art based on the embodiments of the present disclosure, without making any inventive efforts, fall within the protection scope of the present disclosure.

Figure 1:
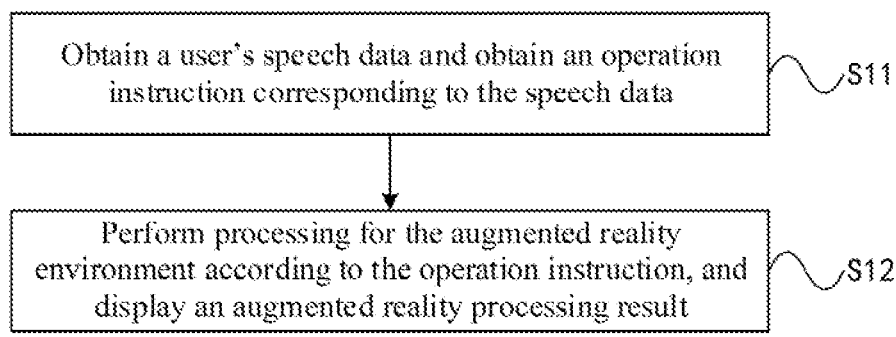
FIG. 1 is a flow chart of a method based on speech and augmented reality environment interaction according to an embodiment of the present disclosure.

FIG. 1 is a flow chart of a method based on speech and augmented reality environment interaction according to an embodiment of the present disclosure. As shown in FIG. 1, the method comprises the following steps:

Step S11: obtaining a user's speech data and obtaining an operation instruction corresponding to the speech data;

Step S12: performing processing the augmented reality environment according to the operation instruction, and displaying an augmented reality processing result.

The method according to the present embodiment can be executed by a control device of augmented reality, the device may be implemented by software and/or hardware and integrated in a mobile terminal having an augmented reality function. The mobile terminal comprises but is not limited to user-held devices such as mobile phones and tablet computers.

In a preferred implementation mode of step S11,

Preferably, the obtaining a user's speech data and obtaining an operation instruction corresponding to the speech data comprises the following sub-steps:

Sub-step S111: activating speech monitoring service to monitor the user's speech data;

Preferably, the audio monitoring device may be an MIC of a hand-held device such as a mobile phone or tablet computer, and used to monitor the user's speech data. Monitoring the user's speech data may be monitoring the user's speech data in real time, or monitoring the user's speech data after completing a preceding operation. For example, it is possible to monitor the user's speech data after activating the augmented reality function, or monitor the user's speech data after completing display of the augmented reality content.

Preferably, if a current scenario is a preset augmented reality sub-environment scenario, it is possible to guide the user to input a preset speech operation instruction. For example, the augmented reality sub-environment scenario is a vehicle 3D model sub-environment scenario, prompts such as "rotate the model", "enlarge the model" and "reduce the model" are displayed in the scenario, the user may input a formatted fixed speech according to the above prompts, and a recognition accuracy is higher. The preset augmented reality sub-environment scenario is entered through a specific entrance of the control device of augmented reality, for example, a plurality of entrances such as a vehicle 3D model and a person 3D model are preset on an APP of the control device, the user enters the preset augmented reality sub-environment scenario by clicking a specific entrance, and the vehicle 3D model is displayed in the preset augmented reality sub-environment scenario.

Sub-step S112: performing speech recognition for the speech data to obtain a recognized text corresponding to the speech data;

Preferably, it is possible to invoke Automatic Speech Recognition (ASR) service to parse the user's speech data to obtain a speech recognition result corresponding to the speech. The speech recognition result is a recognized text corresponding to the speech.

The speech recognition process may employ some current speech recognition technologies, mainly including: performing feature extraction for the speech data, using the extracted feature data and pre-trained acoustic model and language model to decode, determining a grammar unit corresponding to the speech data upon decoding, the grammar unit being for example a phoneme or syllable, and obtaining a recognized text corresponding to the current speech according to a decoding result.

Sub-step S113: performing semantic analysis for the recognized text to obtain an operation instruction corresponding to the recognized text.

Preferably, as the user may input a formatted fixed speech according to guidance in the preset augmented reality sub-environment scenario, it is possible to perform precise matching for the recognized text in the preset operation instruction and look up the corresponding operation instruction.

Preferably, as for other augmented reality sub-environment scenarios other than the preset augmented reality sub-environment scenario, the user may also input a formatted fixed speech. Therefore, it is possible to perform precise matching for the recognized text in the preset operation instruction and look up the corresponding operation instruction.

If the operation instruction precisely matched with the recognized text is not found, it is feasible to perform word segmentation processing for the recognized text to generate a keyword; according to the keyword, look up an operation instruction matched with the keyword in the preset operation instructions.

Preferably, it is possible to, based on a semantic recognition technology, match the recognized text with the preset operation instructions. For example, it is possible to process the recognized text and the preset operation instructions based on the semantic recognition technology, calculate a similarity between the two, and determine that the matching is successful if the similarity between the two is larger than a similarity threshold; otherwise, determine that the matching is unsuccessful. The similarity threshold is not specifically limited in the present embodiment, for example, the similarity threshold may be 0.8.

Preferably, when the keyword is successfully matched with at least two operation instructions, the corresponding operation instruction is obtained according to the user's further selection. For example, it is possible to provide a plurality of options in the augmented reality environment according to successfully-matched multiple operation instructions, and further obtain a corresponding operation instruction according to a selection operation made by the user.

In a preferred implementation mode of step S12, performing processing for the augmented reality environment according to the operation instruction, and displaying the augmented reality processing result.

Preferably, the augmented reality environment comprises: a preset augmented reality sub-environment scenario; or an augmented reality sub-environment scenario obtained by performing feature analysis for a reality scenario captured by the camera.

Preferably, it is feasible to, in the preset augmented reality sub-environment scenario, perform a preset operation according to a formatted fixed operation instruction input by the user, for example, perform operations such as rotation, enlargement and reduction for the displayed 3D model in the preset vehicle 3D model augmented reality sub-environment scenario.

Preferably, it is feasible to perform feature analysis for the reality scenario captured by the camera, upload a corresponding augmented reality sub-environment scenario when the camera captures a specific object, for example, upload a corresponding advertisement augmented reality sub-environment scenario when the camera captures a certain advertisement site. It is possible to perform a corresponding augmented reality control operation for augmented reality information in the augmented reality sub-environment scenario according to the operation instruction. For example, if the user may input a "replay" control instruction, it is possible to control the advertisement augmented reality information in the advertisement augmented reality sub-environment scenario to replay; it is further possible to input a "rotate" control instruction, control the advertisement augmented reality information in the advertisement augmented reality sub-environment scenario to rotate, and select the most appropriate viewing angle to view the advertisement augmented reality information.

Preferably, when the camera does not capture a specific object, it is possible to enter a default augmented reality sub-environment scenario and wait for the user's operation instruction. For example, the user-input speech is "please recommend me a sofa suitable for and matched with space and decoration style of my home", it is possible to perform word segmentation processing for the recognized text to generate keywords "space", "style" and "sofa"; look up to find an operation instruction "display the sofa" matched with the keywords according to the keywords. Then it is possible to display augmented reality information of the sofa in the current augmented reality sub-environment scenario. The user may adjust the augmented reality information of the sofa by means of multiple rounds of speech input, for example, change the sofa type, change the sofa color, change the sofa size, and change the sofa angle.

Preferably, it is feasible to, after performing processing for the augmented reality environment according to the operation instruction, draw the augmented reality information after the processing in an image frame or video stream captured by the camera.

Specifically, it is possible to draw the AR information on the image frame or video stream by using a computer graphic processing technology.

Perform a rendering operation for the augmented reality information and image frame or video stream after the processing, and finally obtain an image frame or video stream for output;

Draw the image frame or video stream obtained from the rendering in a memory for display;

Display the image frame or video stream drawn in the memory on a screen of a mobile terminal having an augmented reality function.

According to the present embodiment, it is possible to improve an interaction efficiency of the augmented reality environment by means of the speech and augmented reality environment interaction.

It needs to be appreciated that regarding the aforesaid method embodiments, for ease of description, the aforesaid method embodiments are all described as a combination of a series of actions, but those skilled in the art should appreciated that the present disclosure is not limited to the described order of actions because some steps may be performed in other orders or simultaneously according to the present disclosure. Secondly, those skilled in the art should appreciate the embodiments described in the description all belong to preferred embodiments, and the involved actions and modules are not necessarily requisite for the present disclosure.

The above is introduction of the method embodiment. The solution of the present disclosure will be further described through an apparatus embodiment.

Figure 2:
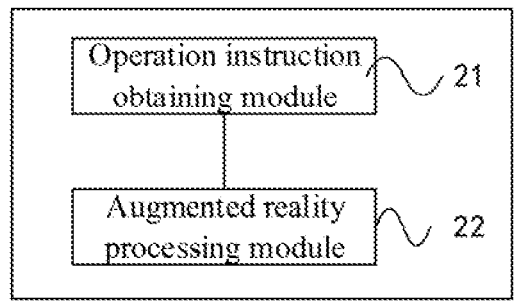
FIG. 2 is a structural schematic diagram of a system based on speech and augmented reality environment interaction according to an embodiment of the present disclosure.

FIG. 2 is a structural schematic diagram of a system based on speech and augmented reality environment interaction according to an embodiment of the present disclosure. As shown in FIG. 2, the system comprises:

an operation instruction obtaining module 21 configured to obtain a user's speech data and obtain an operation instruction corresponding to the speech data;

an augmented reality processing module 22 configured to, according to the operation instruction, perform augmented reality processing for the augmented reality environment and display an augmented reality processing result.

The system according to the present embodiment is executed by a control device of augmented reality, the device may be implemented by software and/or hardware and integrated in a mobile terminal having an augmented reality function. The mobile terminal comprises but is not limited to user-held devices such as mobile phones and tablet computers.

In a preferred implementation mode of the operation instruction obtaining module 21, Preferably, the obtaining a user's speech data and obtaining an operation instruction corresponding to the speech data comprises the following submodules:

a speech obtaining submodule 211 configured to activate speech monitoring service to monitor the user's speech data;

Preferably, the audio monitoring device may be an MIC of a hand-held device such as a mobile phone or tablet computer, and used to monitor the user's speech data. Monitoring the user's speech data may be monitoring the user's speech data in real time, or monitoring the user's speech data after completing a preceding operation. For example, it is possible to monitor the user's speech data after activating the augmented reality function, or monitor the user's speech data after completing display of the augmented reality content.

Preferably, if a current scenario is a preset augmented reality sub-environment scenario, it is possible to guide the user to input a preset speech operation instruction. For example, the augmented reality sub-environment scenario is a vehicle 3D model sub-environment scenario, prompts such as "rotate the model", "enlarge the model" and "reduce the model" are displayed in the scenario, the user may input a formatted fixed speech according to the above prompts, and a recognition accuracy is higher. The preset augmented reality sub-environment scenario is entered through a specific entrance of the control device of augmented reality, for example, a plurality of entrances such as a vehicle 3D model and a person 3D model are preset on an APP of the control device, the user enters the preset augmented reality sub-environment scenario by clicking a specific entrance, and the vehicle 3D model is displayed in the preset augmented reality sub-environment scenario.

A speech recognition submodule 212 configured to perform speech recognition for the speech data to obtain a recognized text corresponding to the speech data;

Preferably, it is possible to invoke Automatic Speech Recognition (ASR) service to parse the user's speech data to obtain a speech recognition result corresponding to the speech. The speech recognition result is a recognized text corresponding to the speech.

The speech recognition process may employ some current speech recognition technologies, mainly including: performing feature extraction for the speech data, using the extracted feature data and pre-trained acoustic model and language model to decode, determining a grammar unit corresponding to the speech data upon decoding, the grammar unit being for example a phoneme or syllable, and obtaining a recognized text corresponding to the current speech according to a decoding result.

A sematic analysis submodule 213 configured to perform semantic analysis for the recognized text to obtain an operation instruction corresponding to the recognized text.

Preferably, as the user may input a formatted fixed speech according to guidance in the preset augmented reality sub-environment scenario, it is possible to perform precise matching for the recognized text in the preset operation instruction and look up the corresponding operation instruction.

Preferably, as for other augmented reality sub-environment scenarios other than the preset augmented reality sub-environment scenario, the user may also input a formatted fixed speech. Therefore, it is possible to perform precise matching for the recognized text in the preset operation instruction and look up the corresponding operation instruction.

If the operation instruction precisely matched with the recognized text is not found, it is feasible to perform word segmentation processing for the recognized text to generate a keyword; according to the keyword, look up an operation instruction matched with the keyword in the preset operation instructions.

Preferably, it is possible to, based on a semantic recognition technology, match the recognized text with the preset operation instructions. For example, it is possible to process the recognized text and the preset operation instructions based on the semantic recognition technology, calculate a similarity between the two, and determine that the matching is successful if the similarity between the two is larger than a similarity threshold; otherwise, determine that the matching is unsuccessful. The similarity threshold is not specifically limited in the present embodiment, for example, the similarity threshold may be 0.8.

Preferably, when the keyword is successfully matched with at least two operation instructions, the corresponding operation instruction is obtained according to the user's further selection. For example, it is possible to provide a plurality of options in the augmented reality environment according to successfully-matched multiple operation instructions, and further obtain a corresponding operation instruction according to a selection operation made by the user.

In a preferred implementation mode of augmented reality processing module 22,

The augmented reality processing module 22 is configured to perform processing for the augmented reality environment according to the operation instruction, and display the augmented reality processing result.

Preferably, the augmented reality environment comprises: a preset augmented reality sub-environment scenario; or an augmented reality sub-environment scenario obtained by performing feature analysis for a reality scenario captured by the camera.

Preferably, it is feasible to, in the preset augmented reality sub-environment scenario, perform a preset operation according to a formatted fixed operation instruction input by the user, for example, perform operations such as rotation, enlargement and reduction for the displayed 3D model in the preset vehicle 3D model augmented reality sub-environment scenario.

Preferably, it is feasible to perform feature analysis for the reality scenario captured by the camera, upload a corresponding augmented reality sub-environment scenario when the camera captures a specific object, for example, upload a corresponding advertisement augmented reality sub-environment scenario when the camera captures a certain advertisement site. It is possible to perform a corresponding augmented reality control operation for augmented reality information in the augmented reality sub-environment scenario according to the operation instruction. For example, if the user may input a "replay" control instruction, it is possible to control the advertisement augmented reality information in the advertisement augmented reality sub-environment scenario to replay; it is further possible to input a "rotate" control instruction, control the advertisement augmented reality information in the advertisement augmented reality sub-environment scenario to rotate, and select the most appropriate viewing angle to view the advertisement augmented reality information.

Preferably, when the camera does not capture a specific object, it is possible to enter a default augmented reality sub-environment scenario and wait for the user's operation instruction. For example, the user-input speech is "please recommend me a sofa suitable for and matched with space and decoration style of my home", it is possible to perform word segmentation processing for the recognized text to generate keywords "space", "style" and "sofa"; look up to find an operation instruction "display the sofa" matched with the keywords according to the keywords. Then it is possible to display augmented reality information of the sofa in the current augmented reality sub-environment scenario. The user may adjust the augmented reality information of the sofa by means of multiple rounds of speech input, for example, change the sofa type, change the sofa color, change the sofa size, and change the sofa angle.

Preferably, it is feasible to, after performing processing for the augmented reality environment according to the operation instruction, draw the augmented reality information after the processing in an image frame or video stream captured by the camera.

Specifically, it is possible to draw the AR information on the image frame or video stream by using a computer graphic processing technology.

Perform a rendering operation for the augmented reality information and image frame or video stream after the processing, and finally obtain an image frame or video stream for output;

Draw the image frame or video stream obtained from the rendering in a memory for display;

Display the image frame or video stream drawn in the memory on a screen of a mobile terminal having an augmented reality function.

According to the present embodiment, it is possible to improve an interaction efficiency of the augmented reality environment by means of the speech and augmented reality environment interaction.

In the above embodiments, different emphasis is placed on respective embodiments, and reference may be made to related depictions in other embodiments for portions not detailed in a certain embodiment.

In the embodiments provided by the present disclosure, it should be understood that the revealed method and apparatus can be implemented in other ways. For example, the above-described embodiments for the apparatus are only exemplary, e.g., the division of the units is merely logical one, and, in reality, they can be divided in other ways upon implementation. For example, a plurality of units or components may be integrated or integrated into another system, or some features may be neglected or not executed. In addition, mutual coupling or direct coupling or communicative connection as displayed or discussed may be indirect coupling or communicative connection performed via some interfaces, means or units and may be electrical, mechanical or in other forms.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

Figure 3:
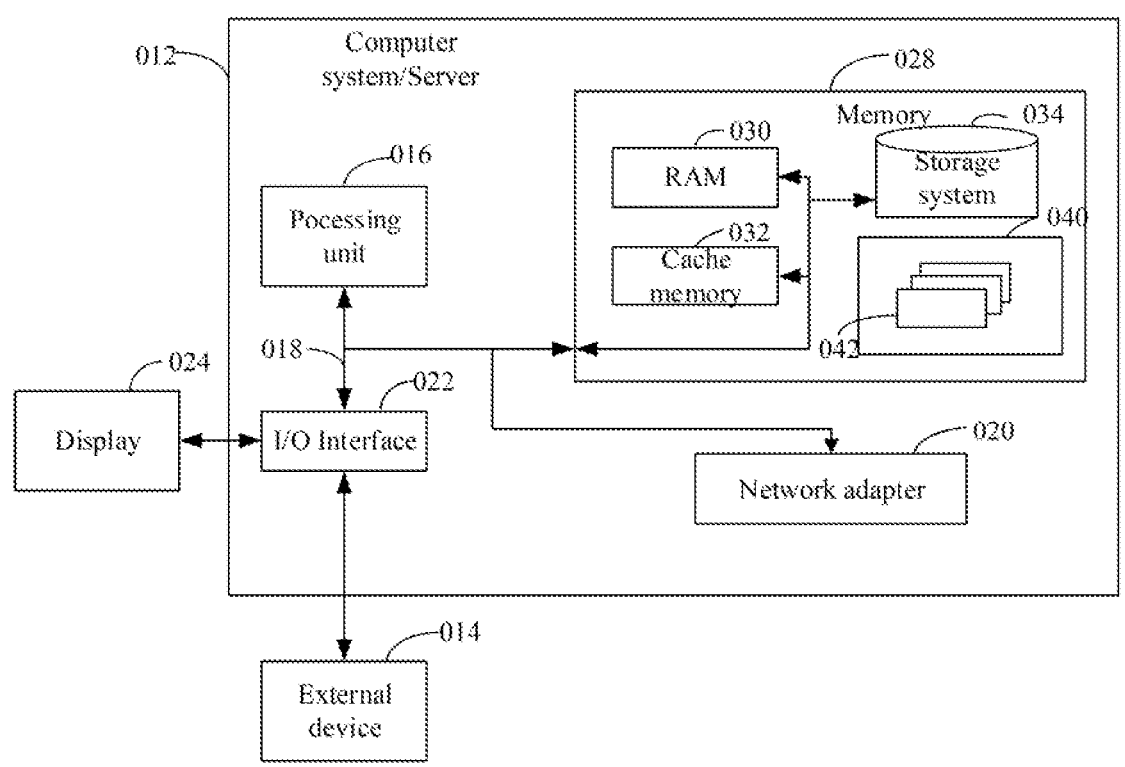
FIG. 3 illustrates a block diagram of an example computer system/server 012 adapted to implement an implementation mode of the present disclosure.

FIG. 3 illustrates a block diagram of an example computer system/server 012 adapted to implement an implementation mode of the present disclosure. The computer system/server 012 shown in FIG. 3 is only an example and should not bring about any limitation to the function and scope of use of the embodiments of the present disclosure.

As shown in FIG. 3, the computer system/server 012 is shown in the form of a general-purpose computing device. The components of computer system/server 012 may include, but are not limited to, one or more processors (processing units) 016, a memory 028, and a bus 018 that couples various system components including system memory 028 and the processor 016.

Bus 018 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 012 typically includes a variety of computer system readable media. Such media may be any available media that is accessible by computer system/server 012, and it includes both volatile and non-volatile media, removable and non-removable media.

Memory 028 can include computer system readable media in the form of volatile memory, such as random access memory (RAM) 030 and/or cache memory 032. Computer system/server 012 may further include other removable/non-removable, volatile/non-volatile computer system storage media. By way of example only, storage system 034 can be provided for reading from and writing to a non-removable, non-volatile magnetic media (not shown in FIG. 3 and typically called a "hard drive"). Although not shown in FIG. 3, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 018 by one or more data media interfaces. The memory 028 may include at least one program product having a set (e.g., at least one) of program modules that are configured to carry out the functions of embodiments of the present disclosure.

Program/utility 040, having a set (at least one) of program modules 042, may be stored in the system memory 028 by way of example, and not limitation, as well as an operating system, one or more disclosure programs, other program modules, and program data. Each of these examples or a certain combination thereof might include an implementation of a networking environment. Program modules 042 generally carry out the functions and/or methodologies of embodiments of the present disclosure.

Computer system/server 012 may also communicate with one or more external devices 014 such as a keyboard, a pointing device, a display 024, etc. In the present disclosure, the computer system/server 012 communicates with an external radar device, or with one or more devices that enable a user to interact with computer system/server 012; and/or with any devices (e.g., network card, modem, etc.) that enable computer system/server 012 to communicate with one or more other computing devices. Such communication can occur via Input/Output (I/O) interfaces 022. Still yet, computer system/server 012 can communicate with one or more networks such as a local area network (LAN), a general wide area network (WAN), and/or a public network (e.g., the Internet) via a network adapter 020. As depicted in the figure, network adapter 020 communicates with the other communication modules of computer system/server 012 via the bus 018. It should be understood that although not shown, other hardware and/or software modules could be used in conjunction with computer system/server 012. Examples, include, but are not limited to: microcode, device drivers, redundant processing units, external disk drive arrays, RAID systems, tape drives, and data archival storage systems, etc.

The processing unit 016 executes functions and/or methods in embodiments described in the present disclosure by running programs stored in the system memory 028.

The above-mentioned computer program may be set in a computer storage medium, i.e., the computer storage medium is encoded with a computer program. When the program, executed by one or more computers, enables said one or more computers to execute steps of methods and/or operations of apparatuses as shown in the above embodiments of the present disclosure.

As time goes by and technologies develop, the meaning of medium is increasingly broad. A propagation channel of the computer program is no longer limited to tangible medium, and it may also be directly downloaded from the network. The computer-readable medium of the present embodiment may employ any combinations of one or more computer-readable media. The machine readable medium may be a computer readable signal medium or a computer readable storage medium. A computer readable medium for example may include, but not limited to, an electronic, magnetic, optical, electromagnetic, infrared, or semiconductor system, apparatus, or device, or any suitable combination of the foregoing. More specific examples (non-exhaustive listing) of the computer readable storage medium would include an electrical connection having one or more conductor wires, a portable computer magnetic disk, a hard disk, a random access memory (RAM), a read-only memory (ROM), an erasable programmable read-only memory (EPROM or Flash memory), optical fiber, a portable compact disc read-only memory (CD-ROM), an optical storage device, a magnetic storage device, or any suitable combination of the foregoing. In the text herein, the computer readable storage medium can be any tangible medium that includes or stores a program. The program may be used by an instruction execution system, apparatus or device or used in conjunction therewith.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Finally, it is appreciated that the above embodiments are only used to illustrate the technical solutions of the present disclosure, not to limit the present disclosure; although the present disclosure is described in detail with reference to the above embodiments, those having ordinary skill in the art should understand that they still can modify technical solutions recited in the aforesaid embodiments or equivalently replace partial technical features therein; these modifications or substitutions do not make essence of corresponding technical solutions depart from the spirit and scope of technical solutions of embodiments of the present disclosure.

What is claimed is:

1. A method based on speech and augmented reality environment interaction, wherein the method comprises the following steps:

obtaining a user's speech data and obtaining an operation instruction corresponding to the speech data;

performing a corresponding augmented reality control operation for augmented reality information in an augmented reality sub-environment scenario according to the operation instruction, and displaying an augmented reality processing result, wherein the performing the corresponding augmented reality control operation comprises performing a preset operation in a preset augmented reality sub-environment scenario according to a formatted fixed operation instruction input by the user;

the augmented reality environment comprises: the preset augmented reality sub-environment scenario, or a corresponding augmented reality sub-environment scenario obtained by performing feature analysis for a specific object in a reality scenario captured by a camera, comprising:

if the camera captures a specific object, uploading the corresponding augmented reality sub-environment scenario obtained by performing feature analysis for a specific object in a reality scenario captured by a camera and performing a corresponding augmented reality control operation for augmented reality information in the corresponding augmented reality sub-environment scenario; and if the camera does not capture a specific object, entering a default augmented reality sub-environment scenario and waiting for the user's operation instruction; and if a current scenario is the preset augmented reality sub-environment scenario, guiding the user to input a preset speech operation instruction, wherein the method further comprises:
drawing the augmented reality information on an image frame or video stream captured by the camera;
performing a rendering operation for the augmented reality information and image frame or video stream to obtain an image frame or video stream for output;
drawing the output image frame or video stream obtained from the rendering in a memory for display; and
displaying the output image frame or video stream drawn in the memory on a screen of a mobile terminal.

2. The method according to claim 1, wherein the obtaining a user's speech data and obtaining an operation instruction corresponding to the speech data comprises:
activating speech monitoring service to monitor the user's speech data;
performing speech recognition for the speech data to obtain a recognized text corresponding to the speech data;
performing semantic analysis for the recognized text to obtain an operation instruction corresponding to the recognized text.

3. The method according to claim 2, wherein the performing semantic analysis for the recognized text to obtain an operation instruction corresponding to the recognized text comprises:
performing precise matching for the recognized text in the preset operation instruction and looking up the corresponding operation instruction; and/or,
performing word segmentation processing for the recognized text to generate a keyword, and looking up an operation instruction matched with the keyword.

4. The method according to claim 3, wherein
when the keyword is successfully matched with at least two operation instructions, obtaining the corresponding operation instruction according to the user's further selection.

5. A computer device, comprising a memory, a processor and a computer program which is stored on the memory and runnable on the processor, wherein the processor, upon executing the program, implements a method based on speech and augmented reality environment interaction, wherein the method comprises the following steps:
obtaining a user's speech data and obtaining an operation instruction corresponding to the speech data;
performing a corresponding augmented reality control operation for augmented reality information in an augmented reality sub-environment scenario according to the operating instruction, and displaying an augmented reality processing result, wherein the performing a corresponding augmented reality control operation comprises performing a preset operation in a preset augmented reality sub-environment scenario according to a formatted fixed operation instruction input by the user;
the augmented reality environment comprises: the preset augmented reality sub-environment scenario, or a corresponding augmented reality sub-environment scenario obtained by performing feature analysis for a specific object in a reality scenario captured by a camera, comprising:
if the camera captures a specific object, uploading the corresponding augmented reality sub-environment scenario obtained by performing feature analysis for a specific object in a reality scenario captured by a camera and performing a corresponding augmented reality control operation for augmented reality information in the corresponding augmented reality sub-environment scenario; and
if the camera does not capture a specific object, entering a default augmented reality sub-environment scenario and waiting for the user's operation instruction; and
if a current scenario is the preset augmented reality sub-environment scenario, guiding the user to input a preset speech operation instruction,
wherein the method further comprises:
drawing the augmented reality information on an image frame or video stream captured by the camera;
performing a rendering operation for the augmented reality information and image frame or video stream to obtain an image frame or video stream for output;
drawing the output image frame or video stream obtained from the rendering in a memory for display; and
displaying the output image frame or video stream drawn in the memory on a screen of a mobile terminal.

6. The computer device according to claim 5, wherein the obtaining a user's speech data and obtaining an operation instruction corresponding to the speech data comprises:
activating speech monitoring service to monitor the user's speech data;
performing speech recognition for the speech data to obtain a recognized text corresponding to the speech data;
performing semantic analysis for the recognized text to obtain an operation instruction corresponding to the recognized text.

7. The computer device according to claim 6, wherein the performing semantic analysis for the recognized text to obtain an operation instruction corresponding to the recognized text comprises:
performing precise matching for the recognized text in the preset operation instruction and looking up the corresponding operation instruction; and/or,
performing word segmentation processing for the recognized text to generate a keyword, and looking up an operation instruction matched with the keyword.

8. The computer device according to claim 7, wherein
when the keyword is successfully matched with at least two operation instructions, obtaining the corresponding operation instruction according to the user's further selection.

9. A non-transitory computer-readable storage medium on which a computer program is stored, wherein the program, when executed by a processor, implements a method based on speech and augmented reality environment interaction, wherein the method comprises the following steps:
obtaining a user's speech data and obtaining an operation instruction corresponding to the speech data;
performing a corresponding augmented reality control operation for augmented reality information in the augmented reality sub-environment scenario according to the operating instruction, and displaying an augmented reality processing result, wherein the performing a corresponding augmented reality control operation comprises performing a present operation in a present augmented reality sub-environment scenario according to a formatted fixed operation instruction input by a user;
the augmented reality environment comprises: the preset augmented reality sub-environment scenario, or a corresponding augmented reality sub-environment scenario obtained by performing feature analysis for a specific object in a reality scenario captured by a camera, comprising:
  if the camera captures a specific object, uploading the corresponding augmented reality sub-environment scenario obtained by performing feature analysis for a specific object in a reality scenario captured by a camera and performing a corresponding augmented reality control operation for augmented reality information in the corresponding augmented reality sub-environment scenario; and
  if the camera does not capture a specific object, entering a default augmented reality sub-environment scenario and waiting for the user's operation instruction; and
if a current scenario is the preset augmented reality sub-environment scenario, guiding the user to input a preset speech operation instruction,
wherein the method further comprises:
drawing the augmented reality information on an image frame or video stream captured by the camera;
performing a rendering operation for the augmented reality information and image frame or video stream to obtain an image frame or video stream for output;
drawing the output image frame or video stream obtained from the rendering in a memory for display; and
displaying the output image frame or video stream drawn in the memory on a screen of a mobile terminal.

10. The non-transitory computer-readable storage medium according to claim 9, wherein the obtaining a user's speech data and obtaining an operation instruction corresponding to the speech data comprises:
  activating speech monitoring service to monitor the user's speech data;
  performing speech recognition for the speech data to obtain a recognized text corresponding to the speech data;
  performing semantic analysis for the recognized text to obtain an operation instruction corresponding to the recognized text.

11. The non-transitory computer-readable storage medium according to claim 10, wherein the performing semantic analysis for the recognized text to obtain an operation instruction corresponding to the recognized text comprises:
  performing precise matching for the recognized text in the preset operation instruction and looking up the corresponding operation instruction; and/or,
  performing word segmentation processing for the recognized text to generate a keyword, and looking up an operation instruction matched with the keyword.

12. The non-transitory computer-readable storage medium according to claim 11, wherein
  when the keyword is successfully matched with at least two operation instructions, obtaining the corresponding operation instruction according to the user's further selection.

* * * * *